INVENTORS
HENRY J. ORCHARD
DESMOND F. SHEAHAN
BY
Spencer E. Olson
ATTY.

United States Patent Office 3,517,342
Patented June 23, 1970

3,517,342

CIRCUIT FOR SIMULATING TWO MUTUALLY COUPLED INDUCTORS AND FILTER STAGE UTILIZING THE SAME

Henry J. Orchard, San Mateo, and Desmond F. Sheahan, San Carlos, Calif., assignors to Automatic Electric Laboratories, Inc., Northlake, Ill., a corporation of Delaware Filed Jan. 17, 1969, Ser. No. 792,083
Int. Cl. H03h *7/02, 7/44, 11/00*
U.S. Cl. 333—24 5 Claims

ABSTRACT OF THE DISCLOSURE

A $\pi$-network of inductors for use, for example, in providing inductorless implementation of certain filter networks having ungrounded inductors, is simulated by a pair of grounded gyrator circuits and their associated capacitors connected back-to-back by a single resistor.

BACKGROUND OF THE INVENTION

This invention relates generally to filter circuits and more particularly to the simulation of ungrounded inductors in a filter network to achieve an inductorless filter.

Extensive work has been done in recent years to simulate inductances so as to eliminate the usually bulky inductor in LC filters. Of the many ways which have been described for designing inductorless filters, the one that appears to give the lowest sensitivity to component tolerances and the lowest noise level involves taking a conventional, doubly-terminated LC filter and replacing each inductor by and RC active device that simulates an inductor. Although this design approach achieves a saving in space, compared with other methods it is relatively expensive and normally the cost can be ustified only for the more difficult filter characteristics; most of the filters in multiplex telephony fall in this class. Many circuits for inductance simulation have been published over the past several years, one of the more promising being a gyrator circuit for transforming a capacitance into an lnductance. Because of the nature of the gyrator circuits, however, it is difficult in some filter networks to directly replace an inductor by a gyrator circuit plus capacity that simulates an inductor; this is particularly true of series or "floating" inductors, both terminals of which are ungrounded.

Consider, for example, the typcial LC bandpass filter circuit of FIG. 1 consisting of series capacitors 10, 12 and 14, shunt capacitors 16, 18, 20 and 24 grounded inductors 26, 28 and 30, and series inductors 32 and 34 in parallel with which series capacitors 36 and 38 are respectively connected. It will be noted that in this circuit configuration inductors 32 and 34 are floating. The loss characteristic of this type of filter is generally symmetrical as shown in FIG. 2. The infinite loss points for frequencies in the lower stop band are caused by the series resonant circuits in the shunt branches, and the infinite loss points at frequencies at the upper stop band are caused by the parallel resonant circuits in the series branches.

It is the object of the present invention to produce an inductorless filter having the general bandpass characteristics of the circuit of FIG. 1, the reason for eliminating the inductors being to reduce the physical size of the filter. As has been noted earlier, the obvious approach to achieve an inductorless filter is to replace each inductor by a capacitively loaded gyrator. A number of gyrator circuits are available, but most of them because of their very nature, simulate an inductor of which one terminal is grounded. Accordingly, it is not readily possible to simulate the floating inductors 32 and 34 in the circuit of FIG. 1.

A number of circuits have been proposed for the gyrator simulation of floating inductors, but, in general, their operation depends on some critical cancellation (of current, for example) to achieve the disconnection from ground. One known circuit for isolating a gyrator circuit from ground is disclosed in U.S. Pat. No. 3,413,576 granted on Nov. 26, 1968 to one of the present applicants and assigned to the assignee of the present application. The circuit described therein is schematically shown in FIG. 3 hereof and uses a balanced constant-current power supply for isolating the gyrator from ground. More specifically, the ungrounded gyrator 40 has its bias terminals coupled through the high impedances presented by two constant current sources 42 and 44 so that the gyrator is effectively "floating" with respect to the bias supply terminals. To achieve isolation by this technique the gyrator must draw constant current from the power supply, but, on the other hand, for a gyrator to be efficient it should use a Class B type of output stage and hence draw current from the power supply dependent upon its signal excitation. These conflicting requirements preclude the simulation of floating inductors with efficient gyrators; efficiency of the gyrators is important so that heat dissipation due to power introduced into the filter circuit may be minimized.

Prior gyrators known to applicants employ some form of non-reciprocal active device, usually taking the form of unidirectional amplifiers. These have been implemented in various ways, but with the development of integrated circuits and other techniques, gyrators have become extremely small and use mainly solid state components. Of the several known forms of gyrators, applicants consider the circuit described by Riordan in Electronics Letters, vol. 3, No. 2, February 1967, pp. 50–51, and shown schematically in FIG. 4 hereof, to be the best. This gyrator generally comprises a pair of operational amplifiers 46 and 48 to which are connected four resistors, $R_1$, $R_2$, $R_3$ and $R_4$ which fix the gyration resistance of the gyrator. Amplifier 48 (assumed to be an ideal amplifier having infinite gain, zero output impedance and infinite input impedance) is driven at its positive input by the voltage $E_1$ appearing across port 1 and the combination of this amplifier and the two feedback resistors $R_1$ and $R_2$ has a gain of $(R_1+R_2)/R_1$. Thus, the output of amplifier 48 can be replaced by a zero impedance generator of E.M.F. $E_2=E_1(R_1+R_2)/R_1$ as indicated in the equivalent circuit of FIG. 4A. Amplifier 46 has both input terminals at potential $E_1$ and, since port 2 connects its negative input to its output, the potential of the latter must be $(E_1+E_2)$. From the simple equivalent circuit of FIG. 4A, one can derive the values of the currents $I_1$ and $I_2$ as follows:

$$I_1=\frac{E_1-(E_1+E_2)}{R_4}=\frac{-E_2}{R_4}$$

$$I_2=\frac{E_2-(E_1+E_2)+E_1(R_1+R_2)/R_1}{R_3}=\frac{E_1R_2}{R_1R_3}$$

Accordingly, the impedance matrix of the gyrator is $$\begin{bmatrix} 0 & \frac{R_1R_3}{R_2} \\ -R_4 & 0 \end{bmatrix}$$

When port 2 is terminatd by a capacitor C, as shown in FIG. 4, port 1 behaves as an inductor having an inductance value, $L=R_1R_3R_4C/R_2$, and is grounded. No cancellations of any kind are involved in the operation and, with perfect amplifiers, the quality of the simulated inductance depends simply upon the quality of the capacitor and the four resistors. Significantly, port 2 of this gyrator is neither grounded nor floating and because of the characteristics of the circuit cannot be used as a general purpose port for connection to other circuits, and as a practical matter, can only be closed with an isolated circuit or component, such as a capacitor, whose impedance to ground is very high compared with the gyration resistances.

As was noted earlier, for maximum power efficiency in a circuit of the type shown in FIG. 4, it is desirable to use amplifiers with Class B output stages. This causes the current drain of the amplifiers 46 and 48 to depend upon the signal drive, and accordingly cannot be used with the flotation circuit disclosed in aforementioned Pat. No. 3,413,576 to produce a floating simulated inductor.

In view of the foregoing difficulties attendant the simulation of floating inductors it would seem necessary if inductorless bandpass filters are to be a reality to design bandpass filters utilizing only grounded inductors. However, the only available filter circuits of this tppe are those shown in FIGS. 5 or 5A which comprise a plurality of series capacitors and shunt inductors and capacitors, and give the unsymmetrical loss curves shown in FIGS. 6 and 6A, respectively. The steep slope at the low frequency end of the characteristic is due to the action of the shunt inductances and the series capacitors, whereas the relatively smaller loss at the high frequency side is caused by the fact that there is effectively only one shunt capacitance operating at high frequency; that is, all of the shunt capacitors are effectively put in parallel by the series capacitors at the higher frequencies. This characteristic is unacceptable for many applications; therefore, a circuit of the form of FIG. 5 or 5A in which gyrators are used to simulate the grounded inductors would not give satisfactory performance.

By applying known network theory, symmetry can be restored to the loss curve of FIG. 6A by replacing half of the series capacitors in the circuit of FIG. 5A by inductors, as shown in FIG. 7. However, here again, if each inductor is to be replaced by a gyrator, there is a requirement for an ungrounded gyrator which, as has been explained previously, is not readily realizable.

Accordingly, it is an object of the present invention to provide a means for realizing a circuit which simulates the behavior of each $\pi$-network of inductors in the network of FIG. 7 by means of two coupled, grounded gyrator circuits.

SUMMARY OF THE INVENTION

Briefly, the foregoing object is realized through applicants' recognition that the characteristics of a gyrator circuit of the Riordan type are such that the series inductors of the circuit of FIG. 7 can be simulated by the addition of just one extra resistor to the pair of Riordan gyrators and associated capacitors which are being used to simulate the two grounded inductors, one on either side of this series inductor. More particularly, applicants have appreciated that the Riordan gyrator together with a capacitor terminating port 2, can be looked upon as a grounded 2-port circuit which has the capability of converting a resistor into an inductor, and that when two such networks are connected back-to-back through a $\pi$-network of resistors the combination will simulate a $\pi$-network of inductors which, in turn, is the electrical equivalent of two mutually coupled inductors.

DESCRIPTION OF THE DRAWINGS

The nature of the invention and a better understanding of its operation will be had from the following detailed description taken in conjunction with the accompanying drawings, in which.

DESCRIPTION OF A PREFERRED EMBODIMENT

Figure 1:
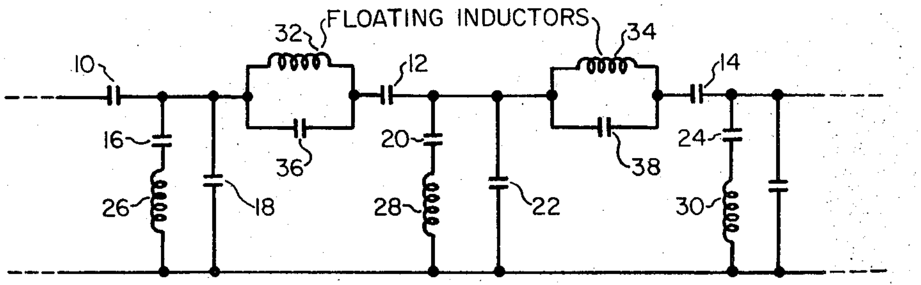
FIGS. 1 through 7A illustrate a known gyrator circuit and known filter circuits and their bandpass characteristics and to which reference has already been made in discussing the background of the invention.
Figure 2:
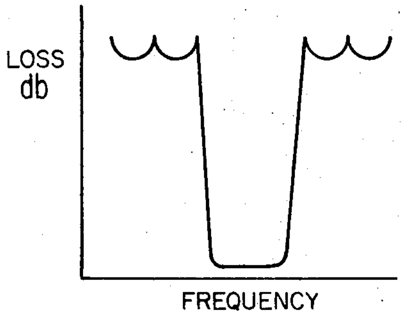
Figure 3:
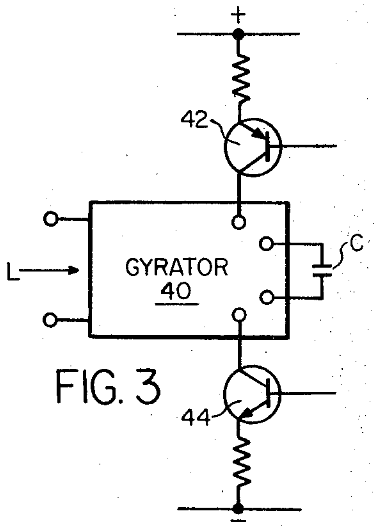
Figure 4:
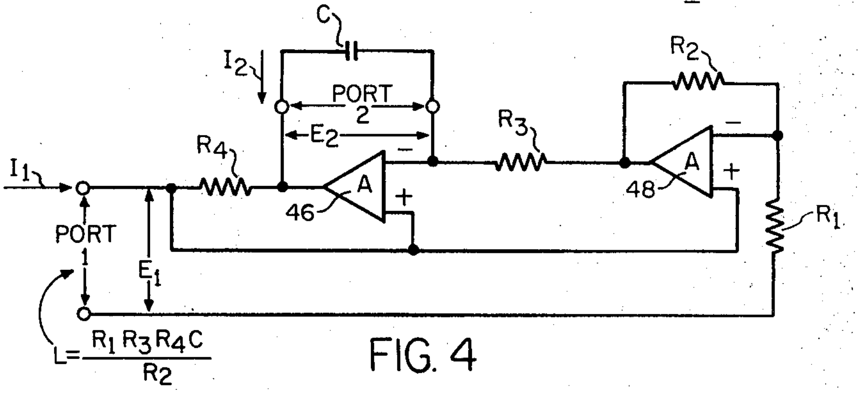
Figure 4A:
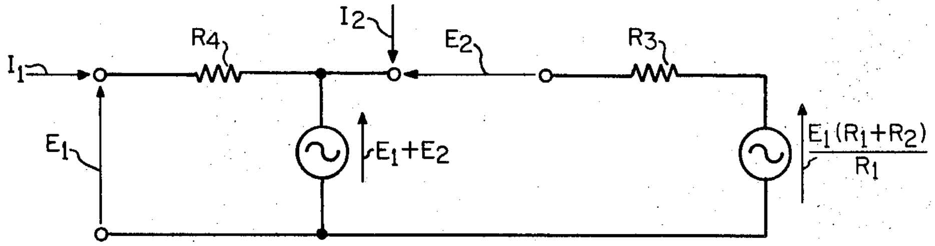
Figure 5:
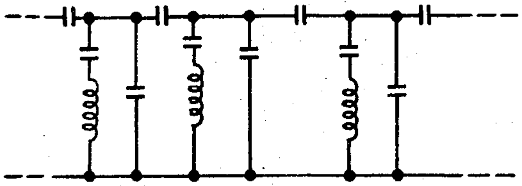
Figure 5A:
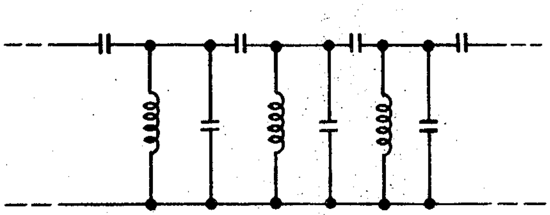
Figure 6:
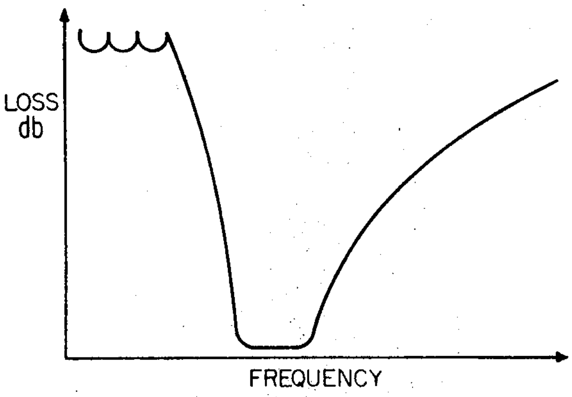
Figure 6A:
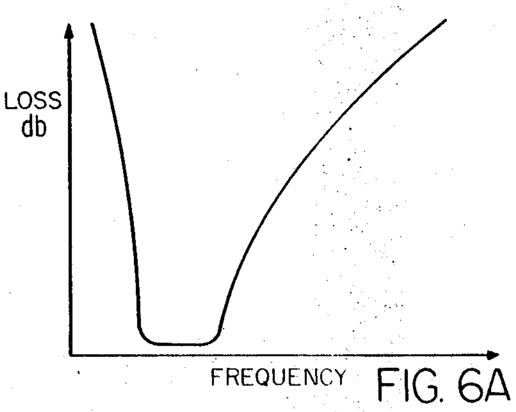
Figure 7:
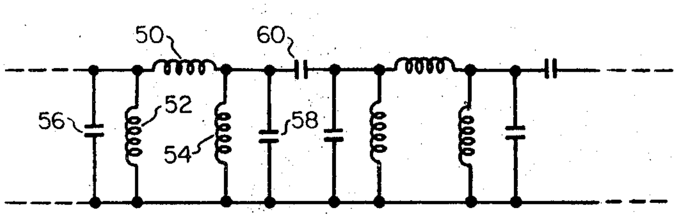
Figure 7A:
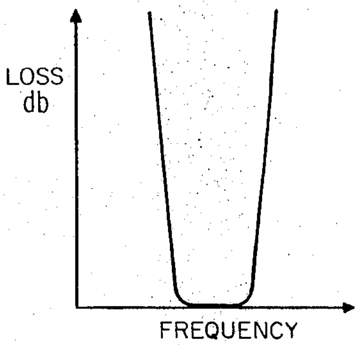

Referring again to FIG. 7, this known filter network, in which each stage comprises a series inductor 50, a pair of shunt inductors 52 and 54 and a pair of shunt capacitors 56 and 58, with succeeding stages coupled by a series capacitor 60, has a symmetrical loss curve, generally of the form shown in FIG. 7A. Again, it will be noted that inductor 50 is ungrounded, making its replacement by a gyrator difficult for the reasons discussed above. Applicants have recognized, however, that the Riordan gyrator circuit has characteristics not previously ascribed to it which enables connecting two of them together back-to-back with a single resistor to achieve simulation of two mutually coupled inductances, and by applying known network theory, simulation of the floating inductor 50 in the circuit of FIG. 7. More particularly, and with reference to FIG. 8, the active components of the Riordan gyrator are two differential-input, operational amplifiers 46 and 48 around which are connected four resistors $R_1$, $R_2$, $R_3$ and $R_4$. It is again noted that port 2 is neither grounded nor properly floating, but is connected, instead, from the output to the input of amplifier 46. This is of little concern, however, for inductance simulation since there is no difficulty in terminating ungrounded port 2 by a floating capacitor, C.

Figure 8:
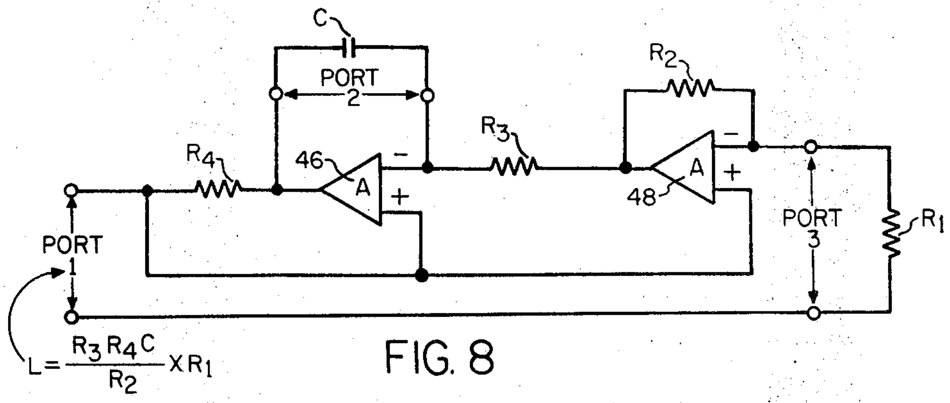
FIG. 8 is a schematic diagram of the Riordan gyrator circuit with a capacitor C terminating port 2.

Apart from its normal application of simulating a grounded inductor, the gyrator circuit of FIG. 8 can be looked upon as a grounded two-port circuit which has the property of converting a resistance into an inductance. Specifically, with port 2 terminated by a suitable capacitor C, a resistor $R_1$ connected at port 3 is converted into an inductance in accordance with the equation $$L=\frac{R_3R_4C}{R_2}\times R_1$$

Figure 9:
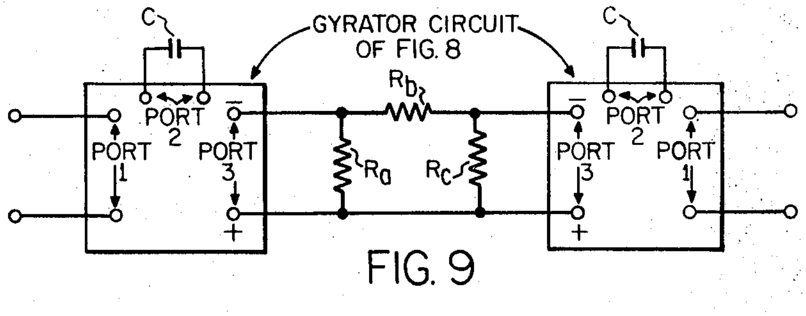
FIG. 9 is a schematic block diagram of two Riordan gyrator circuits, each terminated by a capacitor at port 2, connected together back-to-back in accordance with the invention.
Figure 10:
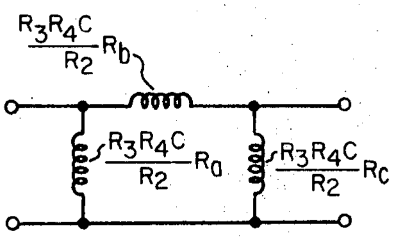
FIG. 10 is the equivalent circuit of FIG. 9.
Figure 11:
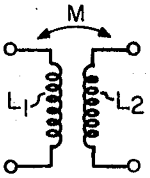
FIG. 11 is the equivalent circuit of the circuit of FIG. 10.
Figure 12:
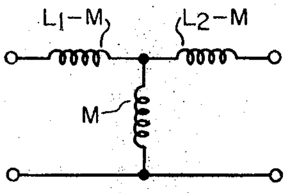
FIG. 12 is the equivalent circuit of FIG. 11.

In other words, looking into port 1 of the network of FIG. 8, and resistor network connected to port 3 appears as a corresponding inductor network. If two such networks are connected back-to-back as shown in FIG. 9, with resistor $R_a$ connected to port 3 of one and resistor $R_c$ connected to port 3 of the other, and the negative inputs of the two amplifiers 48 connected together by resistor $R_b$, the resulting resistive $\pi$-network looks at either port 1 like a $\pi$-network of inductors having the values indicated in FIG. 10. In accordance with known network theory, the $\pi$-network of FIG. 10 is, in turn, the equivalent of two mutually coupled inductors $L_1$ and $L_2$ as shown in FIG. 11 which, in turn, is equivalent to the T-configuration of FIG. 12 where the two series inductors have values $L_1-M$ and $L_2-M$, respectively, and the shunt inductor has a value of M. The similarity between FIGS. 12 and 10 is obvious.

Figure 13:
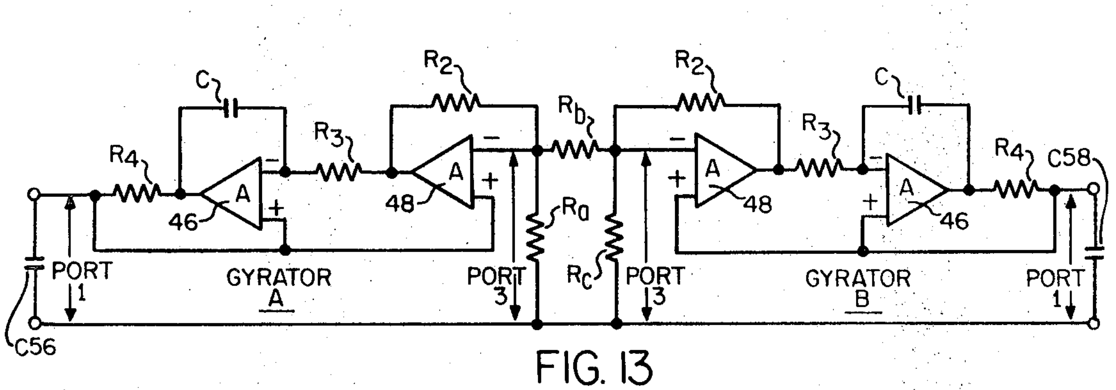
FIG. 13 is a circuit diagram of a preferred embodiment of the invention.
Figure 14:
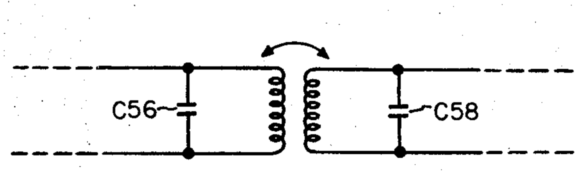
FIG. 14 is the equivalent circuit of FIG. 13.

FIG. 13 illustrates a circuit embodiment of the schematic representation of FIG. 9 and consists of two Riordan gyrators A and B, port 3 of which are terminated by resistors $R_a$ and $R_c$, respectively, connected back-to-back by a single resistor $R_b$. As noted above, this whole circuit simulates two mutually coupled inductors. Thus, when port 1 of each of gyrators A and B is terminated by a capacitor, C56 at port 1 of gyrator A and C58 at port 1 of gyrator B, it gives the circuit shown in FIG. 14 which, in turn, is the electrical equivalent of one stage of the filter network of FIG. 7. Accordingly, a combination of the circuits illustrated in FIG. 13, corresponding to the number of required filter stages, coupled together by capacitors 60 of appropriate value, produces the equivalent of the filter network of FIG. 7, which has a symmetrical loss curve essentially as shown in FIG. 7A.

Among the virtues of the circuit of FIG. 13—apart from achieving an inductorless filter—is that only the gyrator capacitors and the capacitors C56 and C58 need be changed to change the center frequency of the filter passband. In other words, the circuit is to a large extent universal for all channels in a channel bank, for example; that is, most of the circuit can be constructed with standardized amplifiers and resistors, preferably using integrated circuit and thick-film techniques, thereby contributing to manufacturing cost efficiencies, and the circuit parameters established by the connection thereto of discrete capacitors. The operational amplifiers of the gyrator are very small in integrated circuit form, and with the resistors formed by thick-film techniques, it is possible to assemble a complete filter having four filter stages with eight shunt inductors in a package having a volume of less than one cubic inch.

From the foregoing it is apparent that applicants have provided an inductance simulating circuit which can be used in filter networks having ungrounded inductors so as to produce an inductorless filter having a symmetrical bandpass characteristic. This is accomplished by interconnecting two gyrators of the Riordan type back-to-back by a single resistor whereby certain resistors in the circuit appear as inductors, and the addition of two capacitors simulates a stage of a known filter network having a floating inductor, two shunt inductors and two shunt capacitors.

What is claimed is:

1. A circuit for simulating two mutually coupled inductors comprising:

first and second gyrator circuits each including a pair of resistivity interconnected operational amplifiers and having a first two-terminal port, a second two-terminal port terminated by a capacitor C and a third two-terminal port terminated by a first resistor, and resistance means including at least a second resistor interconnecting corresponding terminals of the third port of said first and second gyrator circuits.

2. A circuit for simulating two mutually coupled inductors comprising:

first and second gyrator circuits each having a first two-terminal port and including, first and second operational amplifiers each having first and second input terminals and an output terminal, a first resistor connected between the output terminal of said second amplifier and the first input terminal of said first amplifier, a second resistor connected between the first input terminal of said second amplifier and the output terminal thereof, a third resistor connected between the first input terminal of said second amplifier and one of the terminals of said two-terminal port, a fourth resistor connected between the output terminal of said first amplifier and the second input terminal thereof, means directly connecting the second input terminals of said first and second amplifiers together and to the other terminal of said two-terminal port, and a capacitor connected between the first input terminal of said first amplifier and the output terminal thereof, and resistance means including at least a fifth resistor interconnecting the first input terminals of the second amplifiers of said first and second gyrator circuits.

3. A circuit according to claim 2 wherein said resistance means is a single resistor, said circuit being operative to present at each of said two-terminal ports an inductive $\pi$-network having inductance values proportional to the resistance values of the resistive $\pi$-network formed by the third resistors of said first and second gyrator circuits and said single resistor.

4. A circuit for simulating a filter stage consisting of $\pi$-network of inductors with a capacitor connected in parallel with each of the shunt inductors, said circuit comprising:

first and second gyrator circuits each including a pair of resistively interconnected operational amplifiers and having a first two-terminal port, a second two-terminal port terminated by a capacitor C and a third two-terminal port terminated by a first resistor, resistance means including at least a second resistor interconnecting corresponding terminals of the third port of said first and second gyrator circuits, and first and second capacitors terminating the first port of said first and second gyrator circuits, respectively.

5. A circuit for simulating a filter stage consisting of a $\pi$-network of inductors with a capacitor connected in parallel with each of the shunt inductors, said circuit comprising:

first and second gyrator circuits each having a first two-terminal port and including, first and second operational amplifiers each having first and second input terminals and an output terminal, a first resistor connected between the output terminal of said second amplifier and the first input terminal of said first amplifier, a second resistor connected between the first input terminal of said second amplifier and the output terminal thereof, a third resistor connected between the first input terminal of said second amplifier and one of the terminals of said two-terminal port, a fourth resistor connected between the output terminal of said first amplifier and the second input terminal thereof, means directly connecting the second input terminals of said first and second amplifiers together and to the other terminal of said two-terminal port, and a capacitor connected between the first input terminal of said first amplifier and the output terminal thereof, resistance means including at least a fifth resistor interconnecting the first input terminals of the second amplifiers of said first and second gyrator circuits, and first and second capacitors terminating said two-terminal port of said first and second gyrator circuits, respectively.

References Cited

UNITED STATES PATENTS 2,775,658 12/1956 Mason et al. ______ 333—24.1 X
2,885,492 5/1959 D'Heedene ______ 333—24.1 X ELI LIEBERMAN, Primary Examiner P. L. GENSLER, Assistant Examiner U.S. Cl. X.R.

333—70, 80